United States Patent [19]

Rosenberg

[11] Patent Number: 4,740,302

[45] Date of Patent: Apr. 26, 1988

[54] DIRECT-FLUSHING FILTER AND DISCS PARTICULARLY USEFUL THEREIN

[76] Inventor: Peretz Rosenberg, Moshav Beit Shearim, Israel

[21] Appl. No.: 849,127

[22] Filed: Apr. 7, 1986

[30] Foreign Application Priority Data

Apr. 16, 1985 [IL] Israel .......................................... 74933

[51] Int. Cl.⁴ .............................................. B01D 25/02
[52] U.S. Cl. ..................................... 210/392; 210/488
[58] Field of Search .............. 210/488, 425, 391, 427, 210/392, 393, 433.1, 434, 492, 409, 414, 797, 798, 108, 333.01, 411

[56] References Cited

U.S. PATENT DOCUMENTS

| | | | |
|---|---|---|---|
| 1,035,248 | 8/1912 | Seavey | 210/488 |
| 2,548,584 | 4/1951 | Briggs | 210/488 |
| 3,037,633 | 6/1962 | Veitel et al. | 210/488 |

FOREIGN PATENT DOCUMENTS 610109 6/1959 Italy .

121172 3/1948 Sweden .

Primary Examiner—Frank Sever
Attorney, Agent, or Firm—Benjamin J. Barish

[57] ABSTRACT

A direct-flushing fluid filter comprises a filter body disposed within a housing and defining a first plurality of parallel flow paths from the housing inlet to the filtered fluid outlet, and a second plurality of parallel flow paths from the housing inlet to a dirt-purging outlet. Each of the first flow paths includes a filter passageway for removing dirt particles, and an inlet chamber on the inlet side of the respective filter passageway for accumulating the dirt particles. Each of the second flow paths connects the inlet chambers to the dirt-purging outlet while bypassing its respective filter passageway. The filter further includes a valve between the second flow paths and the dirt-purging outlet, which valve is normally closed but is opened to effect a cleaning of the filter by directly flushing the dirt in the inlet chambers through the second flow paths to the dirt-purging outlet.

20 Claims, 4 Drawing Sheets

DIRECT-FLUSHING FILTER AND DISCS PARTICULARLY USEFUL THEREIN

BACKGROUND OF THE INVENTION

The present invention relates to direct-flushing filters, and particularly to the disc-type filter commonly used today in water irrigation systems. The invention also relates to the construction of a filter disc particularly useful in such filters.

A large number of different types of fluid filters have been developed and are presently in use. Disc-type filters are becoming very popular particularly in the water irrigation field because of their sturdy construction and their capability of retaining large quantities of dirt particles before cleaning is required. The simpler, less expensive disc-type filters are usually cleaned by opening the filters and removing the filter discs for direct flushing. A number of self-cleaning filters have been developed wherein the filter may be cleaned manually or automatically without disconnecting it from the line or opening its housing. In the latter-type filters, the cleaning is usually effected by back-flushing the filter.

An object of the present invention is to provide a new fluid filter. Another object is to provide a fluid filter which can be cleaned by direct flushing and which does not require disconnection of the filter from the line or opening its housing. A further object of the invention is to provide a filter disc particularly useful in the fluid filter of the present invention.

SUMMARY OF THE INVENTION

According to one aspect of the present invention, there is provided a direct-flushing fluid filter, comprising: a housing and a filter body disposed within the housing. The housing has an inlet for the fluid, a filtered fluid outlet, and a dirt-purging outlet. The filter body and housing define a first plurality of parallel flow paths from the inlet to the filtered fluid outlet, and a second plurality of parallel flow paths from the inlet to the dirt-purging outlet. Each of the first plurality of parallel flow paths includes a filter passageway for removing dirt particles, and an inlet chamber on the inlet side of the respective filter passageway for accumulating the dirt particles. Each of the second plurality of parallel flow paths connects the inlet chambers to the dirt-purging outlet while bypassing its respective filter passageway. The filter preferably includes a valve connecting the second plurality of parallel flow paths and the dirt-purging outlet to the atmosphere, which valve is normally closed during a filtering mode but is opened to effect filter by directly flushing the dirt in the inlet chambers through the second plurality of parallel flow paths to the dirt-purging outlet.

In the preferred embodiment of the invention described below, the filter body includes a stack of discs formed with ribs defining the portions of the first plurality of parallel flow paths including the inlet chambers and the filter passageways; the housing includes further ribs defining the portions of the first plurality of parallel flow paths from the filter passageways to the filtered fluid outlet, and the portions of the second plurality of parallel flow paths from the inlet chambers to the dirt-purging outlet.

Such a filter construction provides a number of important advantages: Since the filter is directly flushed, rather than back flushed, it can be cleaned more thoroughly than a back-flushed filter; thus, the flushing fluid need not pass through the filter passageways and therefore the filter passageways do not impose a resistance to the flushing fluid; in addition, the novel construction permits the provision of bigger passages for purging the dirt particles, and exhibits less possibility of particles becoming wedged in the filter passagways. The novel construction also provides large spaces for the accumulation of dirt particles without imposing a large pressure drop across the filter since all the flow paths are in parallel. Still further, the novel construction permits filters to be built of relatively simple parts which can be mass produced at low cost and in volume.

It will be further appreciated that the direct flushing filuid filter of the present invention may be cleaned manually or automatically without disconnecting it from the fluid line or opening its housing in order to provide access to the filter body.

As mentioned earlier, the direct flushing filter of the present invention is particularly useful in the disc-type filter wherein the filter body is constituted of a plurality of filter discs. According to another aspect of the present invention, there is provided a filter disc particularly useful in the direct-flushing filter described above, characterized in that the filter disc is of annular shape and includes an upstream edge and a downstream edge, one face of the disc being formed with a plurality of U-shaped ribs radially-spaced around the disc, each of the U-shaped ribs having parallel legs extending radially of the disc, and an intermediate connecting web at the upstream edge of the disc. As will be described more particularly below, such a disc construction, particularly when used in the direct-flushing fluid filter described above, enhances the many advantages of such a filter in the respects briefly discussed above.

BRIEF DESCRIPTION OF THE DRAWINGS

Further features and advantages of the invention will be apparent from the description below.

The invention is herein described, by way of example only, with reference to the accompanying drawings, wherein.

DESCRIPTION OF A PREFERRED EMBODIMENT

Figure 1:
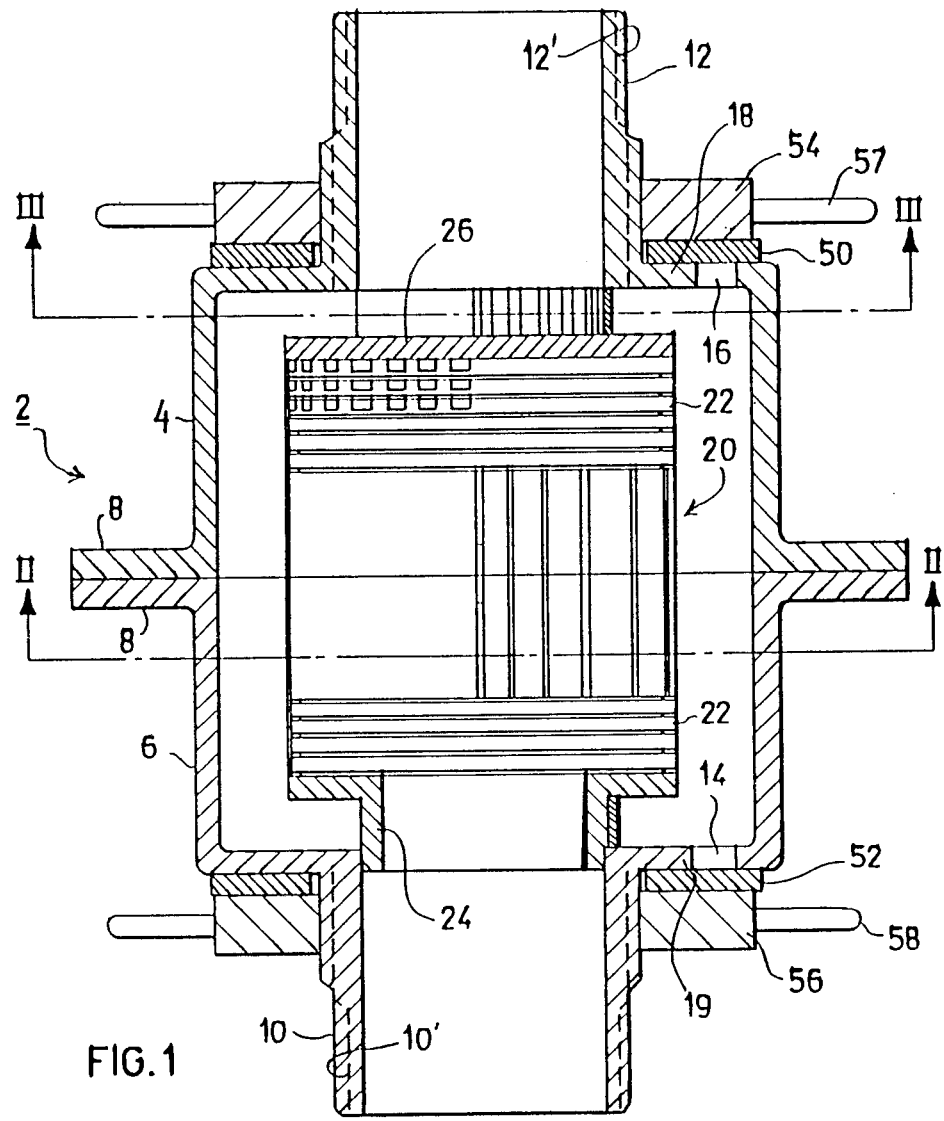
FIG. 1 is a longitudinal sectional view illustrating one form of fluid filter constructed in accordance with the present invention.

The fluid filter illustrated in the drawings is particularly useful in a water irrigation system for removing dirt particles from the irrigating water before the water reaches the irrigating devices, such as sprinklers, drippers or the like, where they may clog the irrigation devices. The illustrated filter is of the disc-type for connection in-line with respect of the water supply line.

Figure 4:
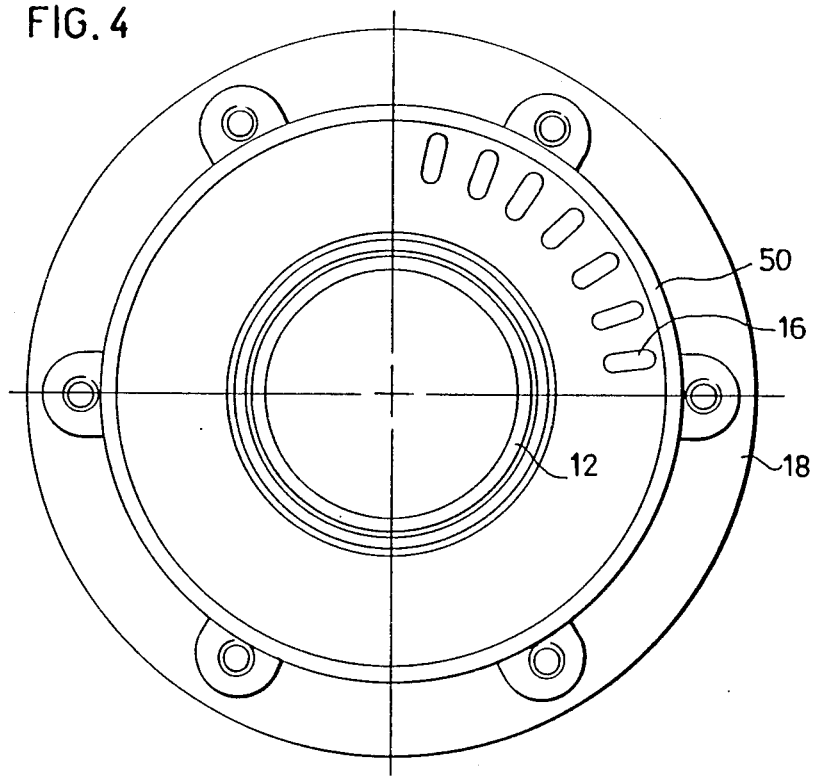
FIG. 4 is an end elevational view of the filter of FIG. 1.

The filter illustrated in FIG. 1 comprises a housing, generally designated 2, constituted of two-like sections 4, 6, secured together by flanges 8. The two housing sections 4, 6 are further formed with ports 10, 12 for connection into the water supply line (not shown). In the illustrated filter, port 10 is to be connected by its external threads 10' to the upstream side of the line and therefore constitutes the housing inlet; and port 12 is to be connected by its external threads 12' to the downstream side of the line and therefore constitutes the housing outlet for the filtered water. Both housing sections 4, 6, are further formed with a plurality of openings 14, 16 (FIGS. 1 and 4) in their respective end walls 18, 19; these openings serve as the dirt-purging outlets for removing the dirt particles separated from the water, as will be described more particulary below.

Figure 5:
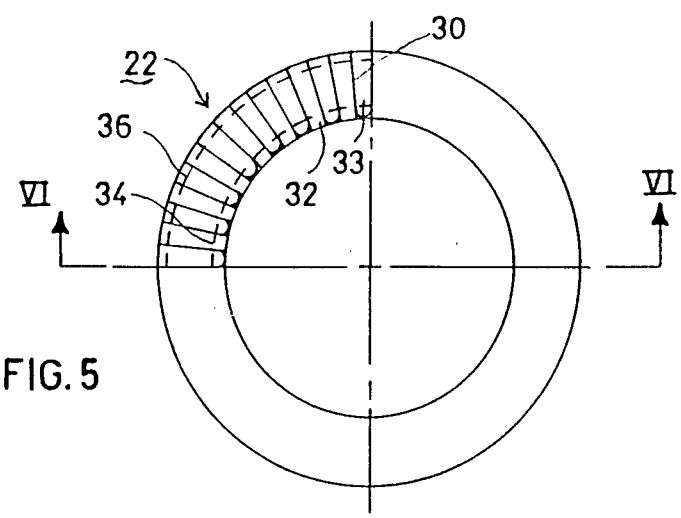
FIG. 5 illustrates one of the discs included in the filter of FIGS. 1-4.

The filter illustrated in FIG. 1 further includes a filter body, generally designated 20, constituted of a stack of filter discs 22 which define filter passageways for removing the dirt particles before the water reaches the filtered water outlet 12. Each of the filter discs 22 is of annular construction, as more particularly illustrated in FIGS. 2 and 5. A collar 24 interposed between one end disc and the inlet 10 is formed with an opening which directs the inletted water to flow first to the inner edge of the stack of discs 22, so that the inner edge constitutes the upstream edge of each filter disc. A solid disc 26 at the opposite end of the stack blocks that end of the stack and thereby forces the water to flow radially through the discs, wherein the solid particles are removed, before the water reaches the filtered fluid outlet 12.

FIGS. 2 and 5–8 more particularly illustrate the construction of each of the filter discs 22.

One face of each filter disc 22 is formed with a plurality of U-shaped ribs 30. circumferentially-spaced around the disc. As shown particularly in FIG. 6, each of the U-shaped ribs 30 includes a pair of parallel legs 30a, 30b extending radially of the disc, and an intermediate connecting web 30c at the inner (upstream) edge of the disc. Each of the U-shaped ribs 30 is spaced from the next one by a space 32; in the described example, space 32 is of substantially the same width as the space 33 between the two legs 30a, 30b of the U-shaped ribs 30, but this is not essential.

The opposite side of each disc 22 is formed with a pair of annular coaxial ribs 34, 36 radially-spaced from each other. Thus, rib 34 is adjacent to the inner (upstream) edge of the disc, and rib 36 is adjacent to the outer (downstream) edge of the disc.

When a plurality of like discs 22 are stacked on top of each other, it will be seen that the outer surfaces of the annular ribs 34, 36 projecting from one face of one disc contact the outer surfaces of the U-shaped ribs 30 of the contiguous disc; this produces a clearance between the contacting faces of the two discs along the length of each of the legs 30a, 30b of the U-shaped ribs 30 between the two annualr ribs 34, 36. These clearances serve as the filtering passageways for removing dirt particles as the water flows in the direction shown by arrows 37, 38 in FIG. 6.

It will be appreciated that the size of these filter passageways, and therefore the size of the particles removed from the water flowing through them, will be determined by the height of the annular ribs 34, 36, and that there may be more than two such ribs. Also to be appreciated is that the spaces 33 between the legs 30a, 30b of the U-shaped ribs 30 receive only filtered water, in which the particles have been removed, the particles accumulating in spaces 32 between the U-shaped ribs 30. All the foregoing ribs 30, 34, 36 have sharp edges to decrease the possibility of particles becoming wedged in the filtering passageways; i.e., each particle either passes from space 32 to space 33, or does not pass and remains in space 32.

Figure 2:
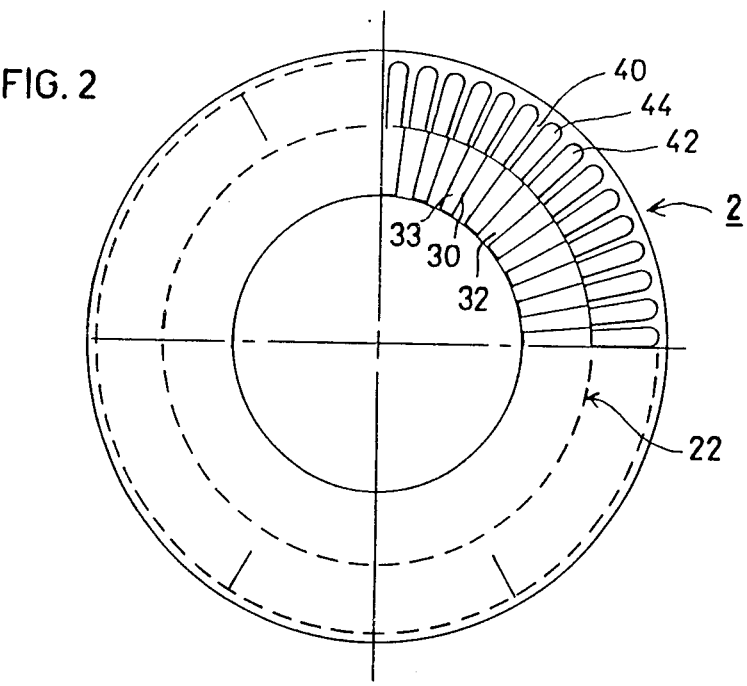
FIG. 2 is a transverse sectional view along lines II—II of FIG. 1.

The inner face of housing 2 is formed with a plurality of circumferentially-spaced ribs 40; these ribs are directed inwardly of the housing, as shown in FIG. 2, and extend axially of the housing for the complete length of the stack 20 of discs 22. There is a housing rib 40 for, and substantially aligned with, each of the two legs 30a, 30b of the U-shaped ribs 30 formed in the filter discs 22.

Thus, the housing ribs 40 define a first group of passageways aligned with the spaces 32 between the U-shaped ribs 30, and a second group of passageways 44 aligned with spaces 33 between the legs of each U-shaped rib 30 in the discs; passageways 44 alternate with passageways 42 around the circumference of the housing.

The discs include registration means, in the form of tabs 46 (FIG. 6) extending outwardly from the space 32 between one or more of the U-shaped ribs 30; these tabs are received within complementary recesses formed in passageways 42 to assure that passageways 42 in the housing will be aligned with the spaces 32 in the discs.

As mentioned earlier, passageways 32 of the discs receive the inletted water and accumulate the dirt particles separated from the water before the water passes into passageway 33. Accordingly, passageways 42 of the housing 2, aligned with passageways 32, define with the latter passageways a plurality of chambers for the accumulation of dirt particles; these chambers are on the upstream side of the filter passageways defined by the legs of the U-shaped ribs 30 between the annular ribs 34, 36. In addition, passageways 33 between the U-shaped ribs 30, which passageways receive the filtered water, are aligned with passageways 44 of the housing 2 and therefore the latter passageways 44 will receive the filtered water.

Passageways 42 and 44 formed in the inner face of the housing 2 extend for the complete length of the stack of discs 22. Accordingly, during the operation of the filter passageways 42 will be continuously filled with unfiltered water, and passageways 44 will be continuously filled with filtered water.

Figure 3:
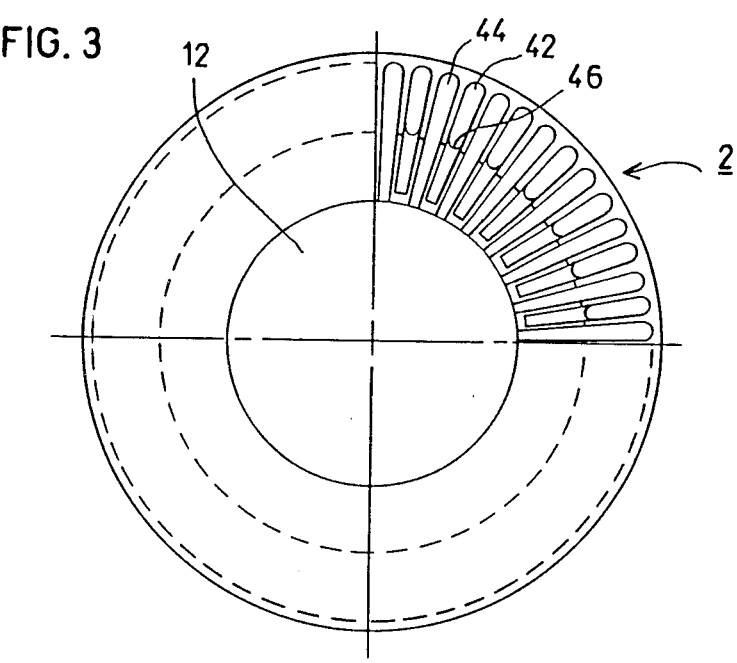
FIG. 3 is a transverse sectional view along lines III—III of FIG. 1.

As shown in FIG. 3, passageways 44, filled with filtered water, are open to the filtered fluid outlet 12 so that the filtered water from all the passageways 44 will pass to the filtered fluid outlet 12. However, passageways 42, filled with the unfiltered water, terminate short of the filtered fluid outlet 12, as shown by surfaces 46 in FIG. 3, and therefore will not pass the unfiltered water to the filtered fluid outlet. The latter passageways 42 communicate with the dirt-purging outlet openings 14, 16 formed in the two end walls 18, 19 so that the unfiltered water within passageways 42 can be discharged through the dirt-purging outlet openings 14 and 16.

Both of the dirt-purging openings 14, 16 are normally closed by a sealing ring 50, 52 pressed against the respective opening by a threaded disc 54, 56. Whenever it is desired to open the dirt-purging outlet openings 14, 16, it is only necessary to withdraw discs 54, 56 (the two discs being provided with handles 57, 58 to facilitate this), whereupon sealing rings 50, 52 are unseated from openings 14, 16, thereby permitting the discharge of the unfilterd water through these dirt-purging openings.

The filter illustrated in the drawings operates as follows:

Normally, discs 54, 56 would be in their positions illustrated in FIG. 1 wherein they press sealing rings 50, 52 to close the dirt-purging openings 14, 16 formed in the end walls 18, 19 of the filter housing 2. The water inletted into the housing via its inlet 10 is directed by collar 24 to flow into the inner region of the stack of filter discs 22. The water then flows into the spaces 32 between the U-shaped ribs 30 of the filter discs 22, and into the passageways 42 formed in the inner surface of housing 2, so that passageways 42 and 32 are filled with the unfiltered water.

Figure 6:
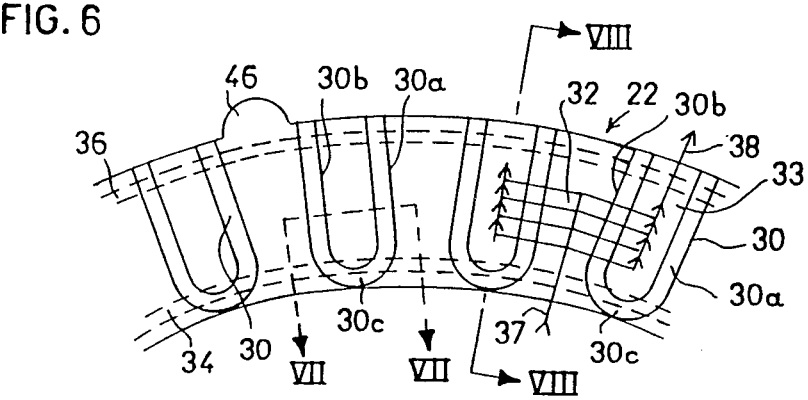
FIG. 6 is an enlarged fragmentary view more particularly illustrating the structure of the filter discs of FIG. 5.
Figure 7:
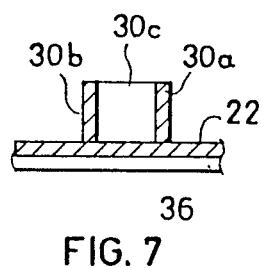
FIG. 7 is a sectional view along lines VII—VII of FIG. 6.
Figure 8:
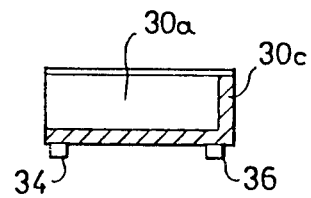
FIG. 8 is a sectional view along lines VIII—VIII of FIG. 6.

The dirt particles within the water are removed as the water flows in the direction of arrow 37 in FIG. 6 across the upper faces of the U-shaped legs 30a, 30b between the annular ribs 34, 36, which spaces serve as the filtering passageways, the separated dirt particles accumulating in spaces 32. Some of the dirt will also tend to accumulate within passageways 42, particularly if the filter is oriented vertically as shown in FIG. 1. The filtered water flowing into spaces 33 between the U-shaped legs 30a, 30b will flow into passageways 44 of the housing. Since the latter passageways communicate directly with the filtered water outlet 12, the filtered water will be thus conducted to the filtered water outlet 12.

Whenever it is desired to clean the filter, it is only necessary to withdraw disc 54 and/or 56, to open the dirt-purging outlet openings 14 and/or 16. Since the unfiltered water passageways 42 communicate directly with the dirt-purging outlet openings 14, 16, a direct flushing action will occur wherein the water flows from the inlet 10 through the spaces 32 in the filter discs 22 into the passageways 42 of the housing 2 and out through the dirt-purging outlet openings 14, 16. Thus, the dirt particles which accumulated in the compartments defined by spaces 32 and passageways 42 on the upstream sides of the filter passageways will be discharged through the dirt-purging outlet openings 14, 16.

It will thus be seen: that the filter discs 22 of the filter body 20, together with the housing 2, define a first plurality of parallel flow paths from the inlet 10 to the filtered fluid outlet 12; that each of these flow paths includes the inlet chambers 32, the filter passageways (the clearance between legs 30a, 30b of the U-shaped ribs 30 within the two annular ribs 34, 36), and the passageways 44 in the housing 2; that spaces 32 and passageways 44 define a second plurality of parallel flow paths from the inlet 12 to the dirt-purging outlet openings 14, 16; and that each of the latter flow paths connects the inlet chambers 32, 42 to the dirt-purging outlet openings 14, 16 while bipassing the respective filter passageways. It will be further appreciated that the latter flow paths to the dirt-purging outlet openings 14, 16 are normally closed by discs 54, 56 and sealing rings 50, 52 during the normal operation of the filter, but may be opened whenever it is desired to clean the filter by this direct flushing action.

The number of such parallel flow paths can be several orders of magnitude. For example, in a modest size filter, the filter could have about 50 filter discs each formed with about 30 U-shaped ribs 30, thereby providing about 1500 parallel flow paths for the filtered water to the filtered water outlet, and a similar number of parallel flow paths for the unfiltered water to the dirt-purging outlets. Such an arrangement provides a maximum holding capacity for dirt particles removed from the water with a minimum of pressure drop, thereby enabling the filter to be used for long periods of time before cleaning is required. When cleaning is required, this may be done in a simple manner by direct flushing as described above.

The illustrated filter thus can be directly flushed, without disconnecting it from the line or disassembling its housing, by merely opening the dirt-purging outlet openings 14 and/or 16. While the drawings illustrate a very simple construction for doing this, namely by manually rotating discs 54, 56, it will be appreciated that this direct flushing operation can also be performed automatically by any one of the known arrangements, for example by including a differential-pressure sensor sensing the drop in pressure across the filter to open the dirt-purging outlets 14, 16 (as by a hydraulic device) whenever the filter is so overly clogged so as to require a cleaning operation. During the cleaning operation the filter continues to function as a filter and therefore no interruption need be made in the line.

An outlet opening 14 may be provided for each of the unfiltered water passageways 42, or a single output opening could be provided communicating with all the passageways 42. According to a further possible arrangement, the housing could be provided with an outlet opening for each of passageways 42 but with an additional rotary disc having a single outlet opening which is rotated in order to successively align its opening with the dirt-purging outlet openings 16 (or 14 on the opposite side of the housing).

A further advantage in the filter illustrated in the drawings is that the two housing sections 6, 8 are of identical construction, and therefore can be made with the same mold, thereby reducing initial tooling costs and inventory control costs. Collar 24 would be applied at the inlet side of the housing, and solid disc 25 would be applied at the opposite side of the housing to direct the water to flow in the required direction as described above.

While the filter discs 22 have been described as all being of the same construction, including the U-shaped ribs 30 on one face and the annular ribs 34, 36 on the opposite face, it will be appreciated that the filter discs could be provided with the U-shaped ribs 30 on both faces, the discs being separated from each other by separator discs which include the annular ribs 34, 36 also on both faces. In such an arrangement, the filter discs including the U-shaped ribs ribs could all be of the same size and construction for all filter sizes, the filter size being determined by the separator discs including the annular ribs 34, 36 on their opposite faces.

Many other variations, modifications and applications of the invention will be apparent.

What is claimed is:

1. A fluid filter, comprising:
a housing;
a filter body disposed within said housing;
said housing having an inlet for the fluid, a filtered fluid outlet, and a dirt-purging outlet;
said filter body and housing defining a first plurality of parallel flow paths from said inlet to said filtered fluid outlet, and a second plurality of parallel flow paths from said inlet to said dirt-purging outlet;
each of said first plurality of parallel flow paths including a filter passageway for removing dirt particles, and an inlet chamber on the inlet side of the respective filter passageway for accumulating the dirt particles;

each of said second plurality of parallel flow paths connecting said inlet chambers to said dirt-purging outlet while bypassing its respective filter passageway for enabling direct flushing of the filter body without disconnection of the filter from the line or opening said housing.

2. The filter according to claim 1, further including a valve connecting said second plurality of parallel flow paths and said dirt-purging outlet to the atmosphere, which valve is normally closed but is opened to effect a cleaning of the filter by directly flushing the dirt in said inlet chambers through said second plurality of parallel flow paths to said dirt-purging outlet.

3. The filter according to claim 1, wherein said first plurality of parallel flow paths from said inlet to said filtered fluid outlet, and said second plurality of parallel flow paths from said inlet to said dirt-purging outlet, each comprises at least two orders of magnitude of parallel flow paths.

4. The filter according to claim 3, wherein said second plurality of parallel flow paths from said inlet to said dirt-purging outlet alternate between said first plurality of parallel flow paths from said inlet to said filtered fluid outlet.

5. The filter according to claim 1, wherein said filter body includes a stack of discs formed with ribs defining the portions of said first plurality of parallel flow paths including said inlet chambers and said filter passageways; and wherein said housing includes further ribs defining the portions of said first plurality of parallel flow paths from the filter passageways to the filtered fluid outlet, and the portions of said second plurality of parallel flow paths from the inlet chambers to the dirt-purging outlet.

6. The filter according to claim 5, wherein said discs are of annular shape, each including an inner edge and an outer edge; one of said edges facing the housing inlet and constituting the upstream edge of the disc, and the other of said edges facing the filtered fluid outlet and constituting the downstream edge of the disc; each contiguous pair of discs having contacting faces formed with ribs defining said filter passageways and said inlet chambers for each of said first plurality of parallel flow paths.

7. The filter according to claim 6, wherein one of said contacting faces of each contiguous pair of discs is formed with a plurality of U-shaped ribs circumferentially-spaced around the disc, each of said U-shaped ribs having parallel legs extending radially of the disc, and an intermediate connecting web at the upstream edge of the disc; and wherein the other of said contacting faces of each contiguous pair of discs is formed with a plurality of annular, coaxial ribs circumferentially-spaced from each other; the outer surface of said annular ribs on one face contacting the outer surface of said U-shaped ribs on the other face to define said filter passageways therebetween, passing particle sizes according to the height of said annular ribs.

8. The filter according to claim 7, wherein the inner face of the housing is formed with a plurality of circumferentially-spaced, inwardly-directed ribs extending axially for the complete length of the stack of discs, and registration means for aligning the spaces between the legs of the U-shaped ribs on the discs with the spaces between the legs of the ribs on the inner face of the housing such that the spaces between a first group of the housing ribs, together with the aligned spaces between the U-shaped ribs of the discs, define said inlet chambers on the inlet side of the filter passageways and also said second plurality of parallel flow paths from said inlet chambers to said dirt-purging outlet, whereas the spaces between second group of the housing ribs, together with the aligned spaces between the legs of each U-shaped rib of the discs, define said first plurality of parallel flow paths from said filter passageways to said filtered fluid outlet.

9. The filter according to claim 8, wherein said second group of housing ribs extend to said filtered fluid outlet to define a plurality of axial passageways for conducting the filtered fluid to said filtered fluid outlet, and said first group of housing ribs alternate with those of said second group and define a further plurality of axial passageways for conducting the unfiltered fluid from said inlet chambers to said dirt-purging outlet.

10. The filter according to claim 9, wherein said last-mentioned of axial passageways extend parallel to said first-mentioned axial passageways but terminate short of said filtered fluid outlet, said dirt-purging outlet including at least one outlet opening communicating with said last-mentioned axial passageways via said valve.

11. The filter according to claim 10, further including a valve comprising a sealing ring pressed against said dirt-purging outlet opening by a threaded disc which is movable to release said sealing ring and thereby open said dirt-purging outlet opening.

12. The filter according to claim 11, wherein there are a plurality of said dirt-purging outlet openings all closed by said sealing ring.

13. The filter according to claim 1, wherein there is a dirt-purging outlet on each of the two opposite sides of the housing.

14. A direct-flushing fluid filter, comprising:
a housing;
a filter body in the form of a stack of discs disposed within said housing;
said housing having an inlet for the fluid, a filtered fluid outlet, and a dirt-purging outlet;
said stack of discs and housing defining a first plurality of parallel flow paths from said inlet to said filtered fluid outlet, and a second plurality of parallel flow paths from said inlet to said dirt-purging outlet;
each of said first plurality of parallel flow paths including a filter passageway for removing dirt particles, and an inlet chamber on the inlet side of the respective filter passageway for accumulating the dirt particles;
each of said second plurality of parallel flow paths connecting said inlet chambers to said dirt-purging outlet while bypassing its respective filter passageway for enabling direct flushing of the filter body without disconnection of the filter from the line or opening said housing;
and a valve connecting said second plurality of parallel flow paths and said dirt-purging outlet to the atmosphere, which valve is normally closed but is opened to clean the filter by directly flushing the dirt in said inlet chambers through said second plurality of parallel flow paths to said dirt-purging outlet.

15. The filter according to claim 14, wherein said first plurality of parallel flow paths from said inlet to said filtered fluid outlet, and said second plurality of parallel flow paths from said inlet to said dirt-purging outlet, each comprises at least two orders of magnitude of parallel flow paths, said second plurality of parallel flow paths from said inlet to said dirt-purging outlet alternating between said first plurality of parallel flow paths from said inlet to said filtered fluid outlet.

16. The filter according to claim 14, wherein said filter body includes a stack of discs formed with ribs defining the portions of said first plurality of parallel flow paths including said inlet chambers and said filter passageways; and wherein said housing includes further ribs defining the portions of said first plurality of parallel flow paths from the filter passageways to the filtered fluid outlet, and the portions of said second plurality of parallel flow paths from the inlet chambers to the dirt-purging outlet.

17. The filter according to claim 16, wherein said discs are of annular shape, each including an inner edge and an outer edge; one of said edges facing the housing inlet and constituting the upstream edge of the disc, and the other of said edges facing the filtered fluid outlet and constituting the downstream edge of the disc; each contiguous pair of discs having contacting faces formed with ribs defining said filter passageways and said inlet chambers for each of said first plurality of parallel flow paths.

18. A filter disc particularly useful in a fluid filter having a fluid body within a housing connectable to a line for enabling direct flushing of the filter body without disconnection of the filter from the line or opening of the housing, characterized in that said disc is of annular shape and includes an upstream edge and a downstream edge, one face of said disc being formed with a plurality of U-shaped ribs circumferentially-spaced around the disc, each of said U-shaped ribs having parallel legs extending radially of the disc and an intermediate connecting web at the upstream edge of the disc.

19. The disc according to claim 18, wherein the upstream edge of the disc is the inner edge of the disc.

20. The disc according to claims 18, wherein the opposite face of the disc is formed with a plurality of annular, coaxial ribs radially-spaced from each other.

* * * * *